US005121215A

United States Patent [19]

[11] Patent Number: 5,121,215

Boers et al.

[45] Date of Patent: Jun. 9, 1992

[54] SURVEILLANCE CAMERA SYSTEM

[75] Inventors: Arie Boers, Plymouth; William L. Hickey, Excelsior, both of Minn.

[73] Assignee: Bayport Controls, Inc., Lake Elmo, Minn.

[21] Appl. No.: 662,966

[22] Filed: Mar. 1, 1991

[51] Int. Cl.[5] .............. H04N 7/18

[52] U.S. Cl. .............. 358/229; 358/108; 354/81

[58] Field of Search .............. 358/108, 229, 210, 100; 354/81, 79

[56] References Cited

U.S. PATENT DOCUMENTS 3,732,368 5/1973 Mahlab .
3,739,703 6/1973 Behles .............. 95/15
3,819,856 6/1974 Pearl et al. .
4,080,629 3/1978 Hammond et al. .............. 358/229
4,320,949 3/1982 Pagano .............. 358/108
4,833,534 5/1989 Paff et al. .............. 358/229
4,901,146 2/1990 Struhs et al. .............. 358/229
4,920,367 4/1990 Pagano .............. 358/108
4,945,367 7/1990 Blackshear .............. 358/108

*Primary Examiner*—Victor R. Kostak
*Attorney, Agent, or Firm*—Hugh D. Jaeger

[57] ABSTRACT

A surveillance camera system including a base plate, a truncated cone, a rotation ring spaced from the base of the truncated cone, a camera assembly which readily mounts within the rotation ring, and a dome which rotates with the camera assembly and is easily engaged into position against spring-biased rollers. The system is a unique and novel combination of electrical and electromechanical components providing for ready access of all components in the event of servicing. The system will accept any suitable surveillance camera, and is readily adaptable with any surveillance camera of the appropriate size.

3 Claims, 5 Drawing Sheets

SURVEILLANCE CAMERA SYSTEM

BACKGROUND OF THE INVENTION

1. Field of the Invention

The present invention pertains to a surveillance camera system, and more particularly, pertains a surveillance camera for use with closed-circuit television systems, such as for store security, building security, and any other security applications.

2. Description of the Prior Art

The prior art surveillance camera systems have been complex electromechanical structures. The structures have been expensive. The structures have also been difficult to install and difficult to maintain. When servicing was required, it would usually require removal of the entire structure which was not always an easy, time-effective procedure.

The present invention overcomes the disadvantages of the prior art by providing a cost-effective surveillance camera system which is easy to install, easy to maintain and will accept any appropriately sized surveillance camera and is not limited to just one type of camera.

SUMMARY OF THE INVENTION

The general purpose of the present invention is to provide a surveillance camera system which is cost effective, easily maintained, and will accept any suitably sized surveillance camera. The system is particularly advantageous in that the camera assembly can be easily engaged or disengaged from a rotation ring within the cone affixed to the base of the surveillance camera system. The dome is likewise easily engaged and disengaged from spring-biased rollers. The dome includes a bracket so that the viewing portion of the dome rotates with the lens of the camera.

According to one embodiment of the present invention, there is provided a surveillance camera system including a base, a truncated cone, and rotation ring affixed to the inner base of the truncated cone. A camera assembly engages the rotation ring with a spring-biased drive wheel of a first drive motor. A second drive motor rotates the camera with respect to the horizon. A base plate is included for the mounting of any suitable security camera. A polymer dome is engaged against spring-biased rollers for ready access to the camera assembly. The surveillance camera system is intended to be readily installed and removed.

Significant aspects and features include a surveillance camera system which is easily installed into an existing structure or new structure.

Another significant aspect and feature is a camera assembly which engages within the surveillance camera system which can be easily engaged or disengaged. The surveillance camera system can even be a deterrent even though a camera assembly may not be installed because of its mere presence and security appearance.

Having thus described the embodiments of the present invention, it is the principal object hereof to provide a surveillance camera system, such as for closed-circuit television cameras.

One object of the present invention is to provide a surveillance camera system which is cost effective.

Another object of the present invention is to provide a surveillance camera system which is easy to install and easy to maintain.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DESCRIPTION OF THE PREFERRED EMBODIMENTS

Figure 1:
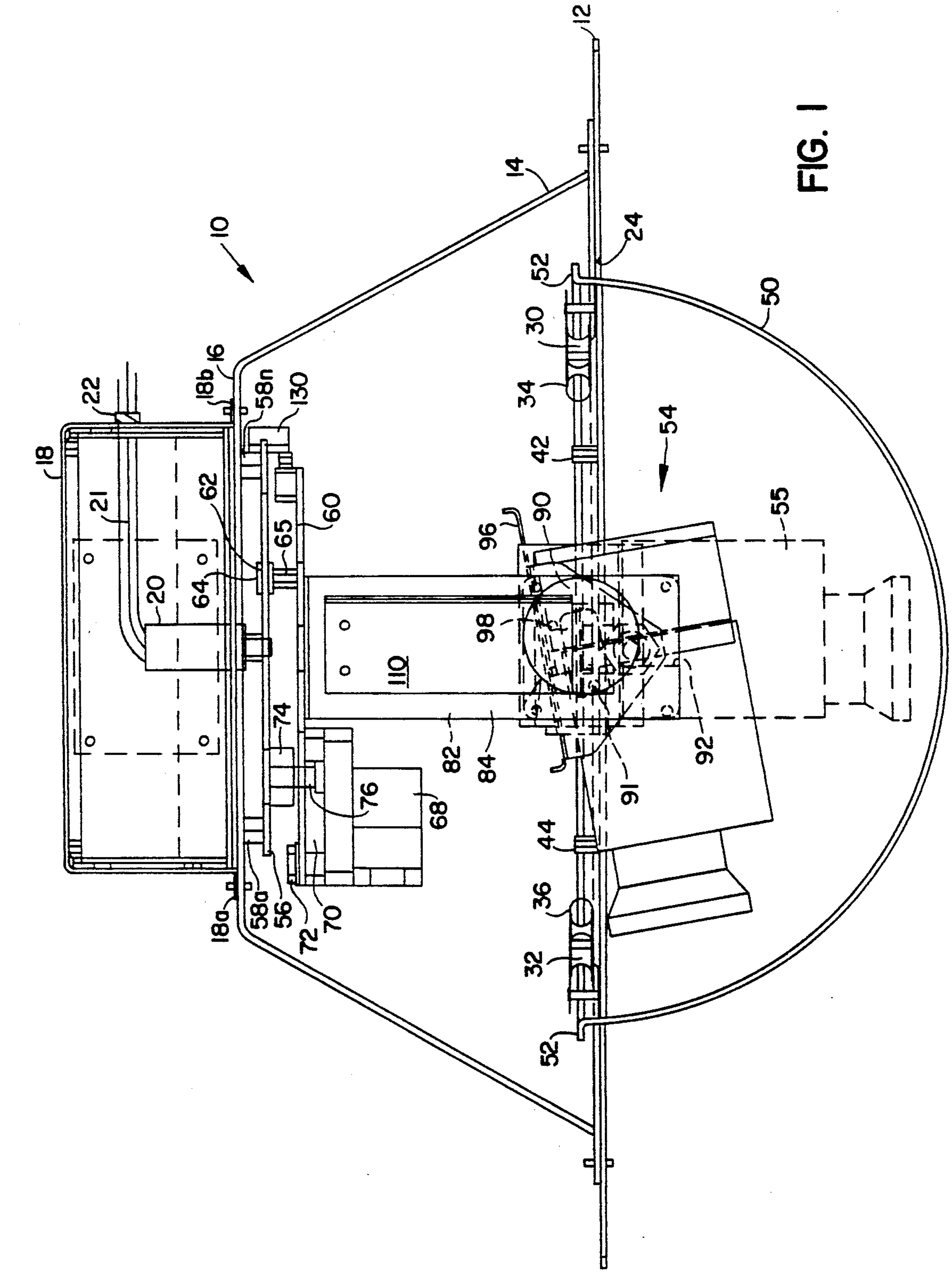
FIG. 1 illustrates a cross-sectional side view of a surveillance camera.
Figure 2:
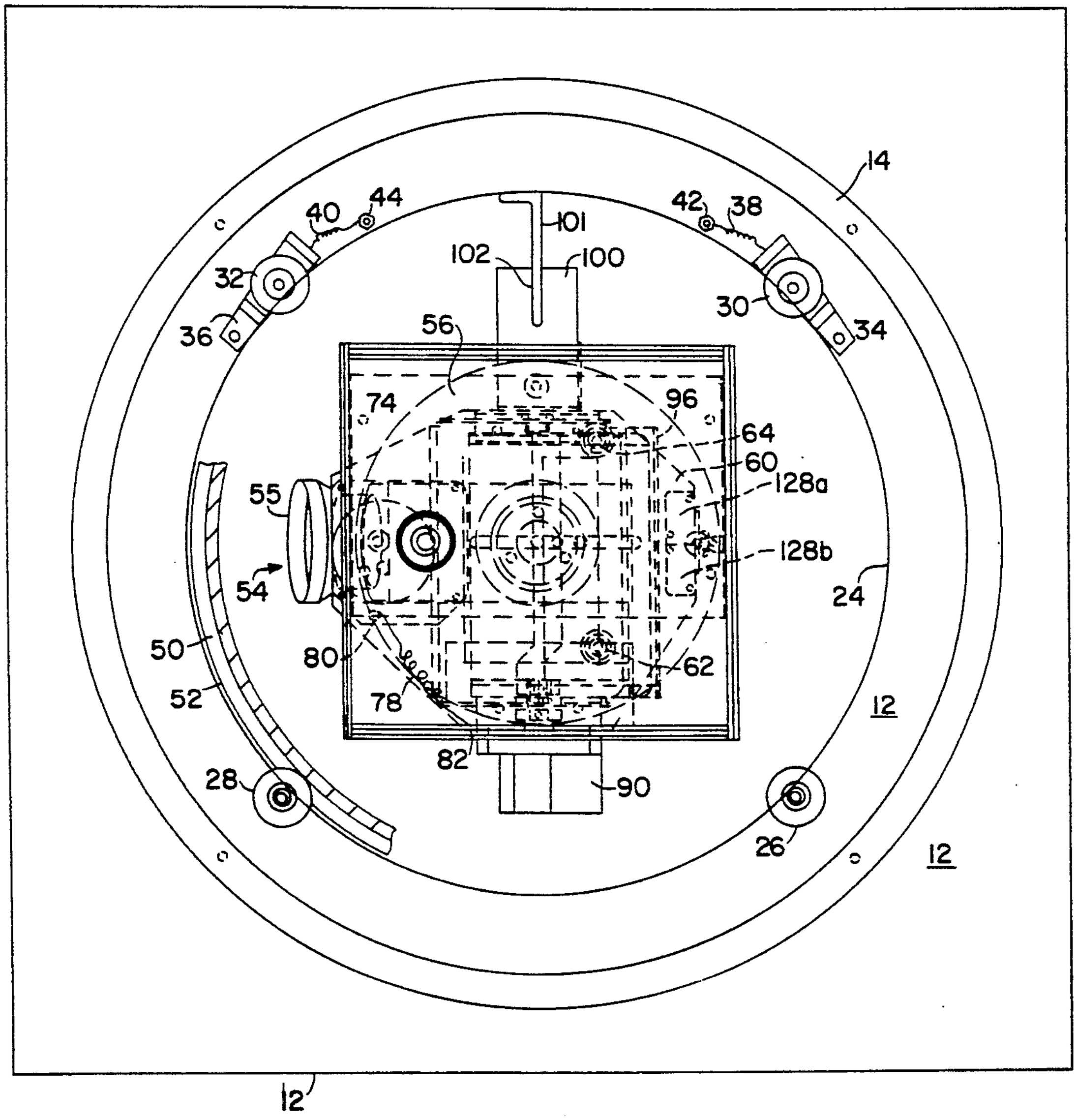
FIG. 2 illustrates a bottom view in partial cross section.

FIG. 1 illustrates a cross-sectional side view of a surveillance camera system 10, the present invention, including a base 12. The size of base 12 is such as to be mounted in the space of a ceiling tile. A truncated cone 14 affixes to the base 12, such as with a plurality of bolts, washers and nuts. A U-shaped bracket 18 affixes to the cone top 16 of the truncated cone 14 with a U-shaped bracket with right angle flanges **18*a*–18*b*. A slip-ring assembly 20, such as that manufactured by Litton Industries, extends through an approximate center of the truncated cone 14 for the passage of the slip-ring assembly 20, including a plurality of electrical communication wires 21, as later described in detail. A wire nut 22 secures the wires for the slip-ring assembly 20 in place. The base 12 includes a large diameter hole 24. Fixed rollers 26 and 28 are suspended on bolt, washer and nut arrangements as illustrated in FIG. 2. Many of the following members are also illustrated with reference to FIGS. 2 and 3. Spring-biased rollers 30 and 32 are positioned in modified pivoting U-shaped brackets 34 and 36, respectively, and are secured within the modified pivotal U-shaped brackets 34 and 36 with bolt, washer and nut arrangements. The modified pivotal U-shaped brackets 34 and 36 are pivotally secured to the base 12 with bolt spacer, washer and nut arrangements. Springs 38 and 40 connect between the modified pivotal U-shaped brackets 34 and 36 and stud assemblies 42 and 44, which are secured to the base. A surveillance dome 50, including a lip 52, is engaged against the spring-biased rollers 30 and 32 and positioned into the grooves of the fixed rollers 26 and 28 for subsequent rotation with the camera assembly 54**, as later described in detail.

A rotation ring 56 is mounted by a plurality of spacers **58*a*–58*n* from the bottom of the truncated cone 14 for support of a camera assembly 54** as later described in detail.

The camera assembly 54 includes a mounting plate 60. Two grooved idler wheel assemblies 62 and 64 are mounted on spacers 63 and 65, respectively, extending from the mounting plate 60. A motor 68 mounts on a motor plate 70. A pivot bolt and washer assembly 72 rotatably secures the motor plate 70 to the mounting plate 60. A drive wheel assembly 74, including a concentric rubber drive secures to the drive shaft 76 of the motor 68. A spring 78 connects from a stud 80 on the motor plate 70 to a bracket 82 affixed to the mounting plate 60 as later described in detail. The rotation ring 56 engages the grooved idler wheels 62 and 64. The drive wheel assembly 74, which is pivotally mounted via the motor plate 70, engages the rotation ring 56 also by the force of the spring 78. This three point suspension of the rotation ring 56 is accomplished so that the rotation ring 56 and any components secured thereto may be driven azimuthally by action of the motor 68. A right upright bracket 82 and a left upright bracket 84 secure to and extend downwardly from the mounting plate 60 as now described in detail. An elevational tilt motor 90 bolts to the right upright bracket 82 which includes an elongated slot 92 for accommodation of the drive shaft 93 and overlying lug 95 of the elevational tilt motor 90, as illustrated in FIG. 6. A rotatable pivot bearing 94 opposes the motor drive shaft 93 on the left upright bracket 84, and is secured thereto by a shouldered bolt 88 and a nut 89. A stud 91 bolts to the left upright bracket 84 and is spaced from the pivot bearing assembly 94. A U-shaped camera mounting plate 96 includes downwardly extending arms 96*a* and 96*b*. The camera mounting plate 96 is suspended between the motor drive shaft lug 95 and the pivot bearing 94. The motor 90 drives the camera mounting plate 96 and an attached camera 55. A rectangular hole 98 in the downwardly extending arm 96*a* of the camera bracket 96 rides about the stud 91 to limit elevational movement of the camera mounting plate 96. An elongated hole 99 is located in the camera bracket for mounting of a camera. A bubble drive bracket 100 extends at a right angle outwardly from the left bracket 84, and includes a slot 102 to accept a bracket 101 secured to the dome 50 so that the dome 50 rotates with the camera assembly 54. The dome 50 includes a clear viewing area 103, while the rest of the dome is of a opaque color for optical considerations.

FIG. 2 illustrates a bottom view in partial cross section where all numerals correspond to those elements previously described. Reference is noted to the fixed rollers 26 and 28 and the spring-biased rollers 30 and 32. The lip 52 of the dome 50 is engaged against the spring-biased rollers 30 and 32 and then engaged into position with the fixed rollers 26 and 28. Also illustrates is the bracket 101 engaging slot 102 of the bubble drive bracket 100 to cause the dome 50 to follow azimuth rotation of the rotation ring 56 and the attached camera 55.

Figure 3:
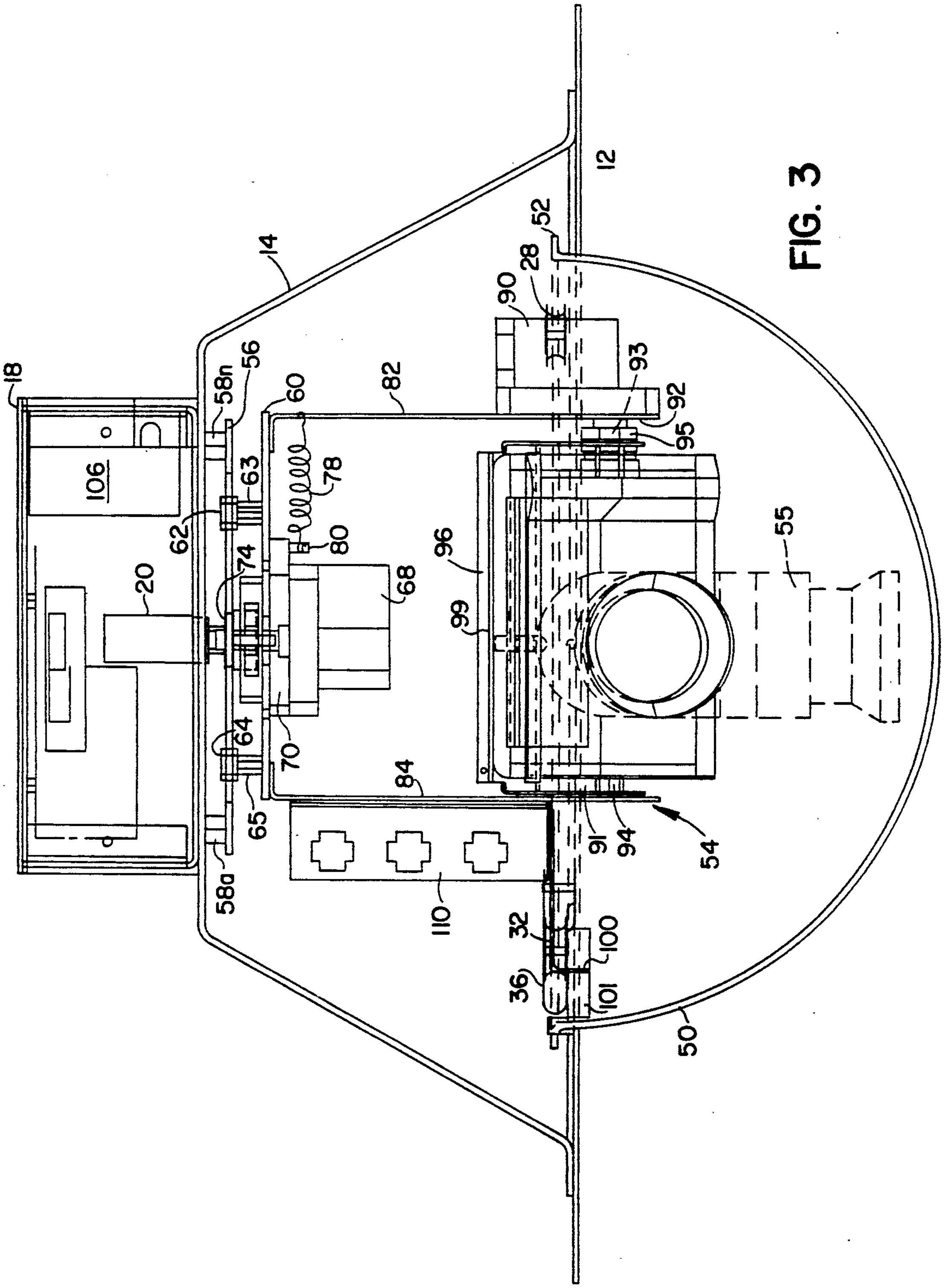
FIG. 3 illustrates a cross-sectional front view.

FIG. 3 illustrates a front view in partial cross section of the surveillance camera where the camera 55 is indicated between a horizontal and a vertical position. Wires from the slip ring assembly 20 and the camera 55 connect to the terminal block area 106 and are not profusely illustrated for the sake of brevity in the drawings.

Figure 4:
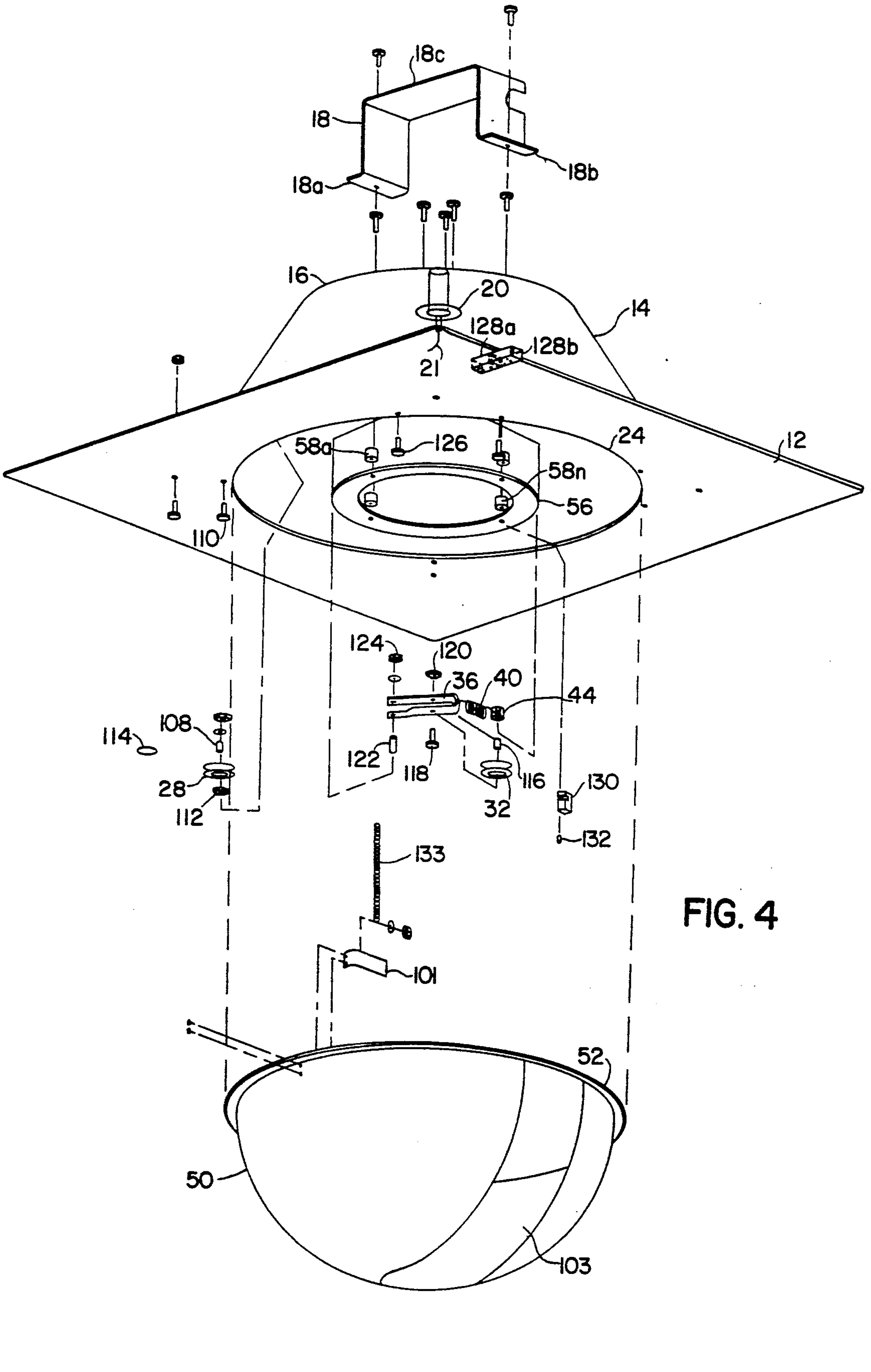
FIG. 4 illustrates an exploded view of the surveillance camera system with the camera assembly removed; and, FIG. 5 illustrates an exploded view of the camera assembly.

FIG. 4 illustrates an exploded view of the surveillance camera system 10 with the camera assembly 55 removed for brevity and clarity of illustration. All numerals correspond to those numbers previously described. An exploded view of the camera assembly 54 is provided in FIG. 5. Illustrated is the fixed roller 28 and its associated component members. The fixed roller 28 aligns over an axle post 108, a screw 110, and mounts over a spacer 112 and is secured appropriately by a nut and washer which is not numbered for purposes of brevity. An O-ring 114 fits over the groove of the fixed roller 28.

The spring bias roller 32 mounts over an axle post 116 and secures to the U-shaped bracket 36 with a nut and bolt 118 and 120. A pivot post 122 aligns with opposing holes in the end of the U-shaped bracket 36. The bracket 36 and pivot post 122 secure to the base 12 with a nut and bolt 124 and 126. Spring 40 attaches to the U-shaped end of the bracket 36 and to the base 12 mounted stud assembly 44 to provide pressure loading of the spring bias roller 32 against the lip 52 of the dome 50. Limit switches 128*a* and 128*b* are located under the truncated cone 14 to provide for rotational limits of the camera assembly 54. A limit switch cam 130 secures to the rotation ring 56 and is secured by a set screw 132. The limit switch cam 130 interacts with the limit switches 128*a* and 128*b*. A safety chain 133 attaches to the bracket 111 and to an appropriate structure point to keep the dome 50 loosely attached to the main structure for servicing or adjustment of the unit.

Figure 5:
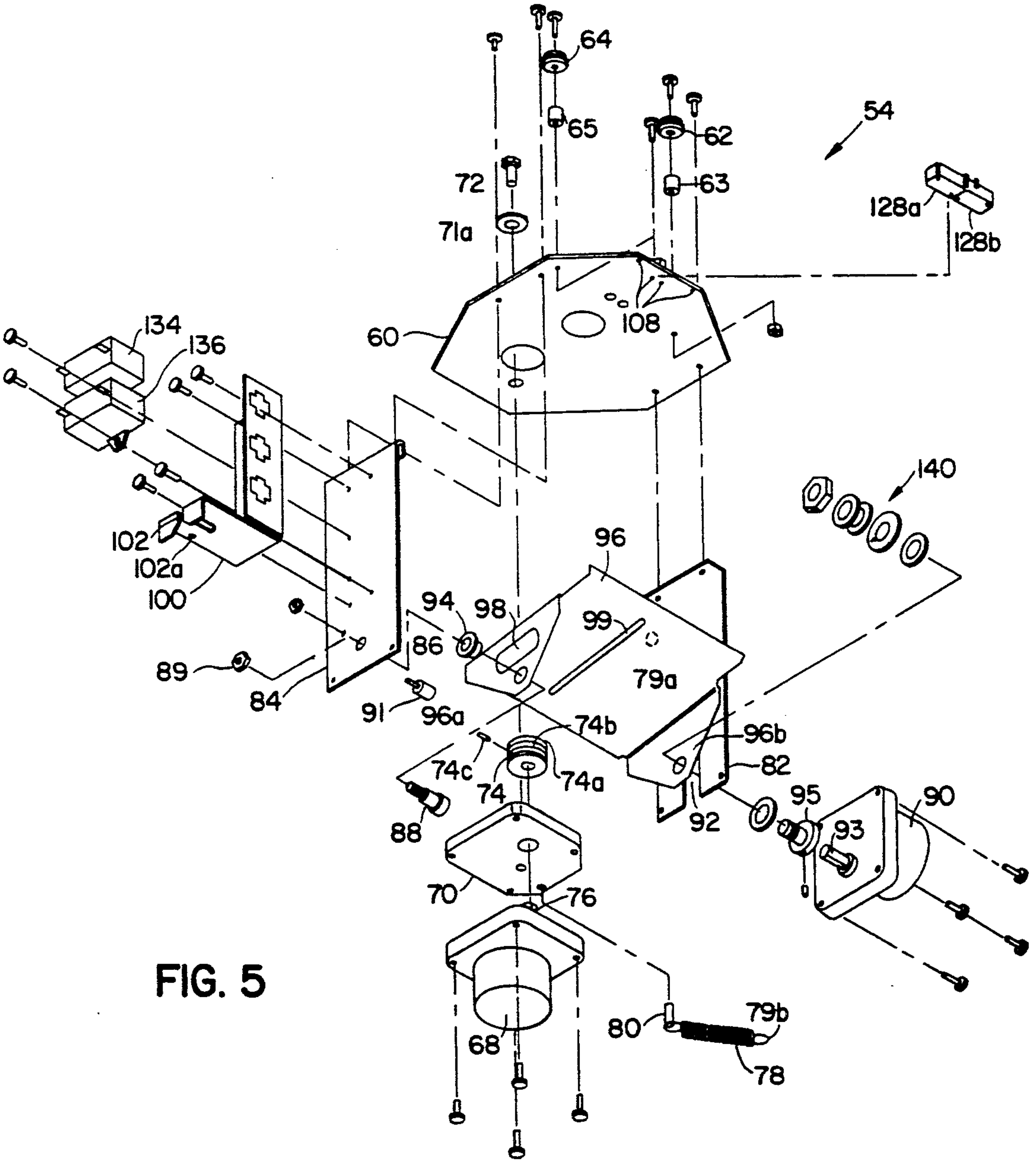

FIG. 5 illustrates an exploded view of the camera assembly 54 where all numerals correspond to those elements previously described. Motor capacitors 134 and 136 secure to the bubble drive bracket 100. Also illustrated are a nut and washer assembly 140 which secures the downwardly extending leg 96*b* of the camera mounting of the camera mounting plate 96 to the lug 95 of the motor 90.

MODE OF OPERATION

The camera assembly 54 is engaged into the rotation ring 56 by movement of the spring-biased motor 68 so that the idler wheels are first positioned and engaged within the inner circumference of the rotation ring 56. Then, the drive wheel 74 is positioned and engaged within the inner circumference of the rotation ring 56. Next, the dome is engaged against the spring-biased rollers 30 and 32 and pushed in to engage with the fixed rollers 26 and 28, while at the same time, aligning the dome drive bracket 101 into the slot 102 of the drive bracket 100 affixed to the bracket 84 on the camera assembly 54. The camera assembly 54 can be secured by the chain 133 to the truncated dome 14 in the event that the camera were to disengage. The base 12 of the surveillance camera can be inserted into a ceiling, such as in the place of a ceiling tile or any other enclosure in the ceiling or the wall.

The surveillance camera is wired to the appropriate monitor, and the motor controls are wired to an appropriate control box, such as a joy stick, for controlling movement of the camera assembly 54.

Various modifications can be made to the present invention without departing from the apparent scope hereof.

We claim:

1. Surveillance camera system comprising:
   a. a base;
   b. a truncated cone affixed to said base;
   c. a rotation ring spaced and affixed to a bottom of said truncated cone;
   d. a camera assembly means including means for rotating said camera assembly means within said rotation ring;
   e. means for rotating said camera assembly between a horizontal access to a vertical access;
   f. fixed roller means and spring-biased roller means affixed to said base; and,
   g. dome means for engagement within said spring-biased rollers and said fixed rollers.
2. A surveillance camera frame comprising:
   a. a base for mounting in a ceiling opening;

b. a camera assembly mounted relative to the base for observance through the ceiling opening;

c. the base having a generally circular opening surrounding the camera assembly;

d. a pair of fixed rollers mounted adjacent the circular opening, and a pair of spring biased rollers mounted adjacent the circular opening generally across the opening from the fixed rollers; and, e. a camera-enclosing dome having a lip for engagement in the four rollers, the dome being mounted in the opening by aligning the lip and the spring biased roller means and uring the spring biased roller means away from the opening until the lip is engaged in the fixed rollers.

3. A mounting system for a surveillance camera dome comprising:

a. a frame having a generally circular opening in which is mounted a surveillance camera, the camera being rotatably mounted within the opening;

b. a dome for enclosing the camera having a generally circular lip sized for fitting within the opening;

c. a fixed roller mounted adjacent the opening for engaging a lip; and, d. a spring biased roller mounted adjacent the opening and generally across from the fixed roller for engaging the lip.

* * * * *